United States Patent
Weber et al.

(10) Patent No.: US 8,537,222 B2
(45) Date of Patent: Sep. 17, 2013

(54) METHOD AND SYSTEM FOR FINDING A MANPADS LAUNCHER POSITION

(75) Inventors: Jonathan L. Weber, Nashua, NH (US); Arnold Kravitz, Moorestown, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 704 days.

(21) Appl. No.: 12/598,489

(22) PCT Filed: Feb. 19, 2009

(86) PCT No.: PCT/US2009/001055
§ 371 (c)(1),
(2), (4) Date: Nov. 2, 2009

(87) PCT Pub. No.: WO2009/139802
PCT Pub. Date: Nov. 19, 2009

(65) Prior Publication Data
US 2011/0069145 A1    Mar. 24, 2011

Related U.S. Application Data

(60) Provisional application No. 61/067,535, filed on Feb. 28, 2008.

(51) Int. Cl.
*H04N 5/225* (2006.01)
*G06K 9/00* (2006.01)

(52) U.S. Cl.
USPC .................................. 348/169; 382/103

(58) Field of Classification Search
USPC .............. 348/164, 169–172, 154, 155, 208.1, 348/208.2, 208.14, 208.16, 352; 382/103, 382/107
See application file for complete search history.

(56) References Cited

U.S. PATENT DOCUMENTS

| | | | |
|---|---|---|---|
| 3,986,682 A | 10/1976 | Dryden | |
| 5,793,889 A | 8/1998 | Bushman | |
| 5,822,713 A | 10/1998 | Profeta | |
| 7,205,520 B1 * | 4/2007 | Busse et al. | 250/203.6 |
| 7,277,053 B2 * | 10/2007 | Riel et al. | 342/432 |
| 7,916,895 B2 * | 3/2011 | Johnson | 382/103 |
| 7,965,868 B2 * | 6/2011 | Roberts et al. | 382/103 |
| 2003/0233278 A1 * | 12/2003 | Marshall | 705/14 |
| 2004/0223056 A1 | 11/2004 | Norris, Jr. | |
| 2007/0097206 A1 | 5/2007 | Houvener et al. | |
| 2010/0008539 A1 * | 1/2010 | Johnson | 382/103 |

* cited by examiner

*Primary Examiner* — Brendan Higa
(74) *Attorney, Agent, or Firm* — Daniel J. Long; Robert K. Tendler

(57) ABSTRACT

A method for finding the launch of a ManPADS missile comprising the steps of installing a network of electro optical (EO) and infrared (IR) cameras with a triggering receiver and pointing the EO and IR cameras in the direction of a suspicious emission, wherein the EO camera provides high resolution video and the IR camera finds the ManPADS and tracks its user.

15 Claims, 4 Drawing Sheets

METHOD AND SYSTEM FOR FINDING A MANPADS LAUNCHER POSITION

RELATED APPLICATIONS

This patent application claims rights under 35 USC §119 (e) from Provisional Application Ser. No. 61/067,535 filed Feb. 28, 2008 entitled Method and System For Finding A ManPADS Launcher Position, the contents of which are incorporated herein by reference.

FIELD OF THE INVENTION

The present invention relates to countermeasures. More particularly the present invention relates to methods and systems for locating terrorists employing a Man Portable Air Defense System (ManPADS) or other weapons to confirm that a missile has been launched or that other weapons have been employed.

BACKGROUND OF THE INVENTION

ManPADS are shoulder fired infrared seeking guided missiles which are used against low flying aircraft. Some experts it the field of counter-terrorism have expressed opinions that ManPADS, if in the hands of terrorists, may pose a hazard to commercial airlines during take off or landing. The prior art has suggested installing devices on commercial airlines for detecting ManPADS launches. There is some concern, however, that the use of such devices on the airlines themselves may result in an unacceptably high false alarm rate (FAR).

The current requirements concerning notification of an attack may require an entire airfield to be shut down for hours during an investigation. Consequently excessive false alarms may impose high costs on the commercial air transport industry at one per airport per week level.

Thus, one of the important and salient problems to be solved is that with the report of a missile launch from an aircraft, the terrorist who has launched an attack can cause more havoc than just simply downing an aircraft. This is because once it is reported that a missile has been fired at an aircraft the entire airport and surrounding area is shut down. So even if the missile is diverted off course or misses its target, there are four to six hours worth of havoc created by the fact of just merely launching a rocket.

Also, if terrorists have made themselves known by firing a missile, and one doesn't know where the terrorist is, he may have more than one missile, which means that even if he misses he can try again. This is why the terrorists who fire a missile can in effect deny the use of airport for a considerable length of time.

A need, therefore, exists for an improved way of detecting, confirming and locating the position of a ManPADS launch location. This confirmation preserves airport operation by eliminating false alarms while at the same time assisting neutralization of the attackers.

More particularly, if a missile launch has been detected there needs to be a system for ascertaining that the detected missile launch is not a false alarm and if not a false alarm to deploy countermeasures and personnel to catch the terrorists and to prevent them from doing more harm once a missile has been fired. While countermeasures may be deployed on an aircraft to deflect an oncoming missile, this does nothing to capture the terrorists.

While ground assets can be instantly deployed if the location of a ManPADS launch has been ascertained, false alarm rates are prohibitive because if assets are deployed every time there is detection of a potential ManPAD launch there will be neither sufficient personnel nor sufficient resources to catch the terrorists or perpetrators.

It is therefore a necessity to be able to identify the fact of a launch and to ascertain whether it is a false alarm or not, and if not, to precisely locate and track the individuals who launched the attack. After a detected launch there must be continuous surveillance of the detected launch area to provide uninterrupted recorded video of sufficient resolution to enable facial recognition; and to provide precise location and tracking as the individual or individuals attempt to flee after an attack.

Also, if the individuals are apprehended there must be sufficient continuous evidence of their activities and their identities to permit effective prosecutions and convictions, along with the requisite chain of custody.

Moreover, with such a capability comes the deterrent effect of deploying such a system because it denies certainty that an attack will be successful in disrupting air travel. If that is the terrorists' goal, then the likelihood of success is much minimized and the terrorists may be dissuaded. Also, with such a system the terrorists may think twice about their ability to launch an attack and get away with it. Thus, there needs to be a system that removes the false alarm indications and if a detected attack is found valid, there needs to be a system for tracking the perpetrators and providing evidence of the crime in sufficient detail to apprehend and convict the perpetrators.

SUMMARY OF THE INVENTION

According to the present invention, a network of electro-optical (EO) and infrared (IR) cameras with a triggering receiver is installed in the area of an airport to detect launches, locate the launch point and catch the perpetrators on video. To do this a three layer system is employed. First is the use of a threat launch detector that covers 360°. This determines if there is a launch. If such is detected, a moderate field of view fast frame rate detector locates the event within a few meters. Thereafter, narrow field of view, high resolution visible band cameras having line of sight to the event are stewed to the event and are activated to continuously record and monitor the perpetrators.

Note, the high resolution cameras are rapidly pointed in the direction of suspicious emissions. The high resolution cameras provide high resolution court admissible video. These high resolution EO cameras may also include a co-located IR tracker that locates the "smoking" weapon and the person or persons using it.

This invention thus solves the problem of effectively countering ManPADS and other weapons (1) by rapidly dealing with the false reports and (2) by promptly activating a network to locate and track terrorists with minimal disruption of airport operation and maximum chance of apprehending terrorists. Because confirmation of an event triggers the system, all high resolution cameras are only activated on a confirmed event and are not continuously surveiling such that deployment has minimal civil liberties impact. This is because there is no continuous surveillance at an intrusive level of resolution.

More particularly, in one embodiment the subject surveillance system has three layers:

Acquisition Layer a) Wide field threat launch detection typically using a single pixel covering the entire field of view of the node.

High Speed Localization b) Moderate field of view Visible or IR event localization, with fast frame rate sufficient to locate the event within a few meters.

High Resolution Surveillance c) High resolution, narrow field of view camera operating in the visible region of the electromagnetic spectrum, with directable illumination to provide night capability. The line of sight visibility requirement (the operator has to visually acquire a target to lock the ManPADS) assures that haze and fog will not prevent fine acquisition and tracking of the perpetrators.

More particularly, in the acquisition layer a passive launch detector device is standing by waiting to detect an explosive launch event. In parallel with this, a wide field, low resolution video camera which can detect visible or infrared energy is covering the area with enough spatial resolution that it can time synchronize the detected launch from the video camera with a flash in the picture event from the launch detector to locate the launch. That location is then passed to one or more high resolution sensors via computers that automatically turn the high resolution cameras onto the location, put them in focus and turn on the illuminators if necessary. They also cue a human operator to start looking at the screen.

The response of the high resolution system is much faster than human operators, so the system provides a human operator the opportunity to backtrack and actually have a high possibility of seeing the perpetrator whose face they can recognize now holding the weapon so they can tie the face to the action.

The above layers are summarized as follows: The first layer is the threat launch detector, and the second layer is the generic wide field, high speed area surveillance camera to obtain event location. By high speed is meant on the order of 100 frames per second. The advantage of the high speed it takes advantage of the fast response of the threat launch detector because it is relying on the fact that although many flash events occur, only a few will occur within tenth of a second. Those that occur within a tenth of a second are those sensed by the threat launch detector. The false alarm rate for this layer need only be low enough to prevent operator fatigue or loss of confidence in the system, typically as much as a few per hour.

The third layer is the high resolution surveillance which is the part that creates the legal evidence showing the terrorist in the act of committing a crime.

Note that the wide field of view localization camera has insufficient resolution to raise Constitutional issues. Its job is only to locate not to identify. In general, the wide angle localization camera is constantly recording and then forgetting events. Thus, these cameras only keep information for about a second.

The narrow field of view high resolution cameras are only turned on when an event has been confirmed. These are commercial grade video cameras with zoom and stabilization.

Creation of wide areas of surveillance incurs a high political cost due to United States Constitutional restrictions and is probably unworkable without the subject invention. The Constitutional enabler is that the persistent surveillance is non-invasive, i.e. it has too little resolution to identify people or even vehicles. The invasive elements are enabled only by the detection of an explosive event, providing probable cause for a detailed search, and is limited to the small area of the explosive event, expanding as required to track the identified perpetrators.

Note, installation of surveillance around tens of square miles around airports gives rise to constant surveillance issues. American constitutional law generally looks down on constant surveillance and Americans have a natural aversion to such surveillance which would make the political cost of installing a surveillance system very difficult. The subject system is therefore designed so that wide area constant search is non-intrusive, in that it is too low in resolution to identify people or even vehicles.

In summary, in the subject system surveillance is done on the above three layers. The first layer identifies that an event has happened. The second layer locates the event, again with insufficient resolution to identify people. The third layer applies high resolution surveillance and only when there is sufficient cause. That is, that the system has identified that an event has in fact occurred. The idea behind the threat launch detector is to get the cameras pointed at the likely source within a few seconds or less. This presents a very high likelihood that the cameras will actually capture imagery of the perpetrator while they are still holding the smoking weapon.

Neutralization of the attackers includes collection of legally admissible and convincing evidence identifying the individuals. Identification includes capture of the act within seconds of the launch with enough detail to assure positive identification. Collection of such information counters this form of terrorist activity in three ways:

a) It provides rapid determination of an event and location of the perpetrators, reducing the period of airport denial to a non-disruptive level.

b) It significantly increases the likelihood of the perpetrators being caught and neutralized.

c) It enables wider use of on-aircraft countermeasures reducing the probability of a successful attack to negligible levels.

Note, the requirement for admissible evidence dictates that the high resolution surveillance be acquired in the visible spectral band. Moreover, even fanatical suicidal terrorists are reluctant to make the ultimate sacrifice when the odds of producing a significant result are very low.

A significant enabler for setting up the surveillance is that the launch of a missile, RPG, projectile or other device implies a clear line of sight to the aircraft at low altitude. This insures that a reasonable distribution of surveillance assets has a very high probability of having a good line of sight to the threat launch event.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
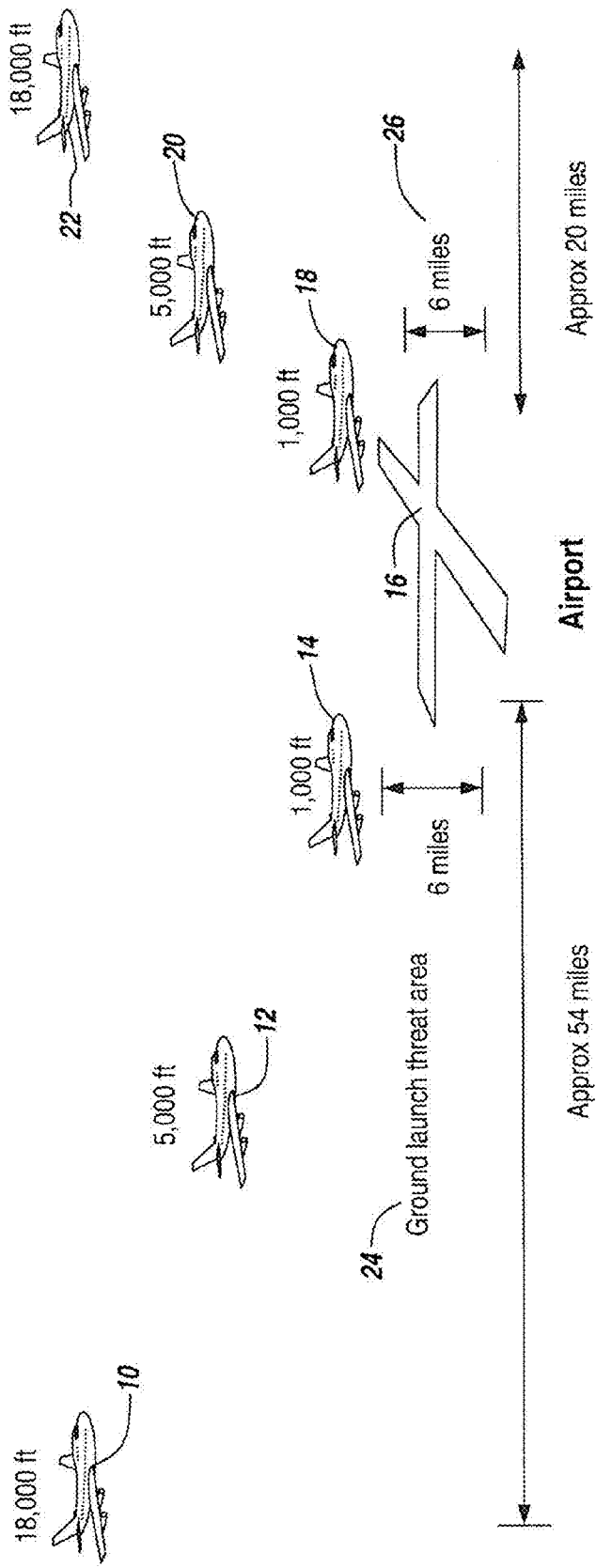
FIG. 1 is a diagrammatic illustration showing the area that typically has to be searched in the event of an attack notification from any incoming or departing aircraft.

The counter terror network involved in the subject invention includes a set of sensing and observing nodes distributed over take off and landing regions of airports capable of handling wide body commercial aircraft. FIG. 1 shows the scope of the area which has to be monitored in the event of a notification of an attack. This area corresponds to the runway in use. Many large airports have several runways to enable them to operate under varied wind conditions, each having a corresponding runway to be monitored. In FIG. 1 successive positions of an incoming aircraft are shown at 10, 12 and 14. There is also an airport 16 and successive positions of an outgoing aircraft at 18, 20 and 22. Also shown is a ground launch threat area 24 for incoming aircraft that are landing, and a launch threat area 26 for outgoing aircraft that are taking off.

Figure 2:
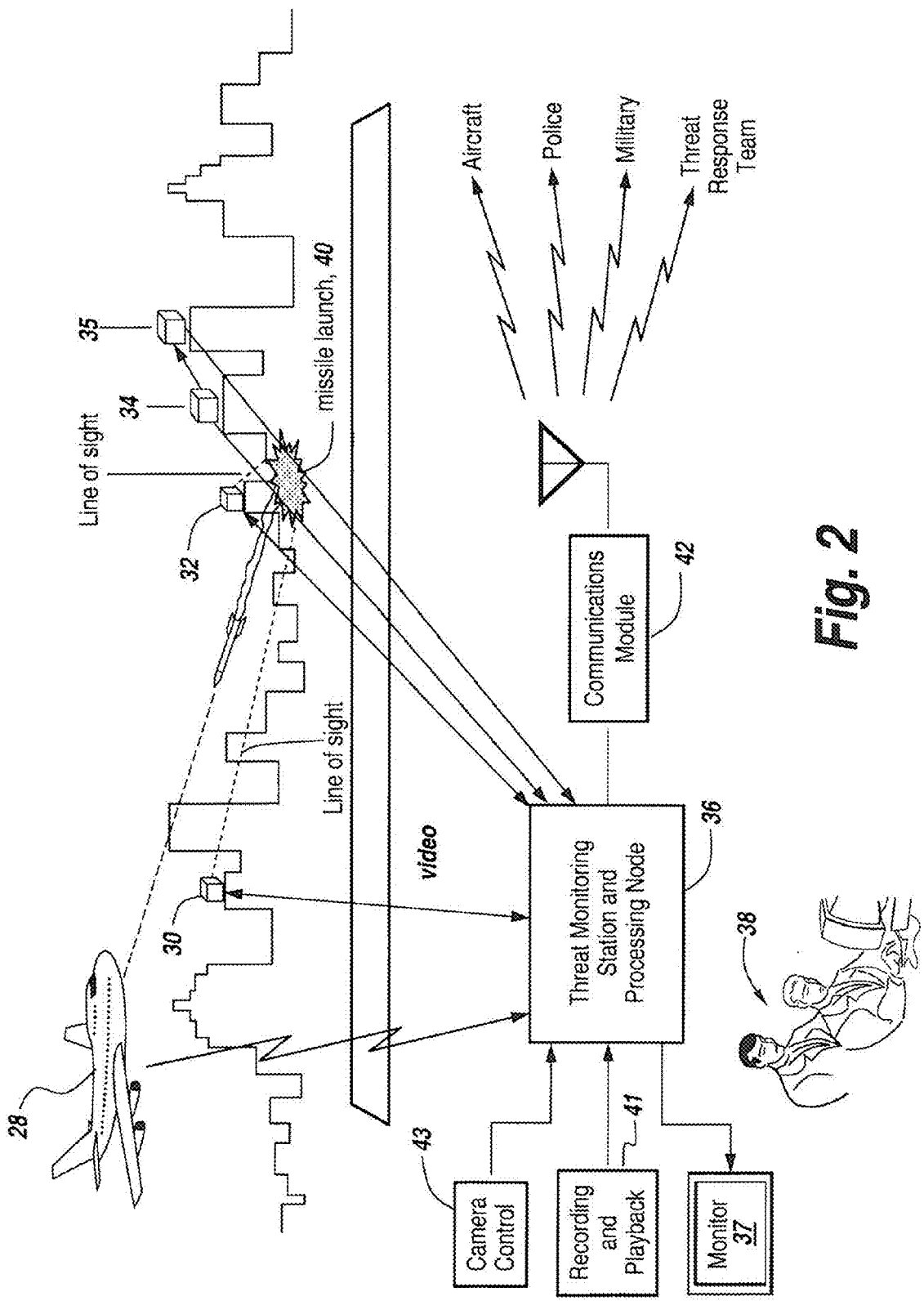
FIG. 2 is a diagrammatic illustration showing the elements of the preferred embodiment of the system of the present invention.

Referring to FIG. 2, what is shown is an incoming aircraft 28, two sensor nodes 30 and 32, a missile launch detector 34, an event localization detector 35, and a threat monitoring station 36 containing a monitor 37 and having two human observers 38.

The threat launch detector useable in the subject invention is described in PCT Patent Application Serial No. PCT US 05/7590 based on U.S. Provisional Application No. 60/542, 042 filed Feb. 5, 2004 incorporated herein by reference.

The threat launch detection system usable in the subject application is one which has an exceedingly wide aperture and a single pixel sensing element in combination with a non-imaging concentrator, which in one embodiment is a two-stage parabolic concentrator. The reason for using a single pixel element is to be able to offer a highly reliable time profile of the event. Note that the use of a single pixel element prevents contamination of the sensed energy due to its spread across multiple pixels, called sharing loss, were multiple pixel sensors used.

It was found that such a threat launch detector will be effective since it has been found that the deployment of projectiles, missiles and the like have a strikingly similar and reproducible signature. The result is that one can rapidly and robustly detect the firing of such a device. These devices include ManPADS, or shoulder fired rockets, projectiles and rock propelled grenades which are deployed by igniting an eject charge. This charge when ignited produces a highly recognizable projectile launch spike. In summary, it has been found that all man portable weapons always have an eject charge which is detectable and has a unique and reliable signature.

The other class of weapons that can be used against aircraft are simple guns. The gun has a different signature because the ejection of the projectile and its forward momentum is created by only one charge. This signature is also detectable by the subject system.

Note that in man portable weapons one needs an eject charge to get the weapon far enough away from the launcher to prevent the operator from being burned. In short, the short ejection charge gets the device far enough away to protect the operator, while at the same time launching it on a sufficiently precise trajectory so that the rocket or projectile stays oriented properly and can keep its target in sight.

In the illustrated scenario, an incoming aircraft counter ManPADS has just spotted a missile launch 40 but probably has not declared it. The event is however declared based on the output of a threat launch detector sensor 34 in combination with the output from event localization detector 35. Thereafter two sensor nodes 30 and 32 have simultaneously seen the event and have transmitted this information along with video after having slewed to the event location. This video has been transmitted in real time to a monitor, where in this case two observers evaluate it. The observers determine if there is a threat. To assist them, the system has playback capability 41 enabling the observers to evaluate the scene from moment the sensors establish lines of sight. The observers can declare a threat or non threat and pass this information along to aircraft, law enforcement or other agencies via a communication module 42.

Note, the use of a Threat Launch Detector (TLD) 34 can be used to detect a launch and to aim a camera at the launch site within less than one second of launch; literally capturing the "smoking gun" sequence of operation. Once a location has been provided, the processing node selects sensors that potentially have a line of sight to it and points them to the launch location. Human observers at video screens see video and can either watch a programmed search or drive cameras via a joystick or similar control 43. Human observers may be assisted by inclusion in the high resolution camera acquisition algorithms of face detection capability as currently available in consumer digital still and video cameras, Once the human observers determine that either an event has occurred or not, they take appropriate action.

If the human observers determine no activity, they may issue an all clear or continue surveillance command. If they find activity, they initiate tracking on one or more subjects. The processing node maintains the geolocation of the launch site or perpetrators so it can bring other sensors to bear to retain a line of sight. Unless the terrorist subjects enter a building, they can be tracked and their location can be continuously transmitted to an action team to find and capture the terrorist subjects. Even if they enter a building, the subject system can monitor the building to determine when and where they leave it, if they do. Thus the sensor and tracking network provide a continuous track, with a human observer to provide confirmation and identification. The system therefore can show a terrorist subject in an unbroken chain of evidence from the appearance of smoke up to capture, with the capture being recorded.

Figure 3:
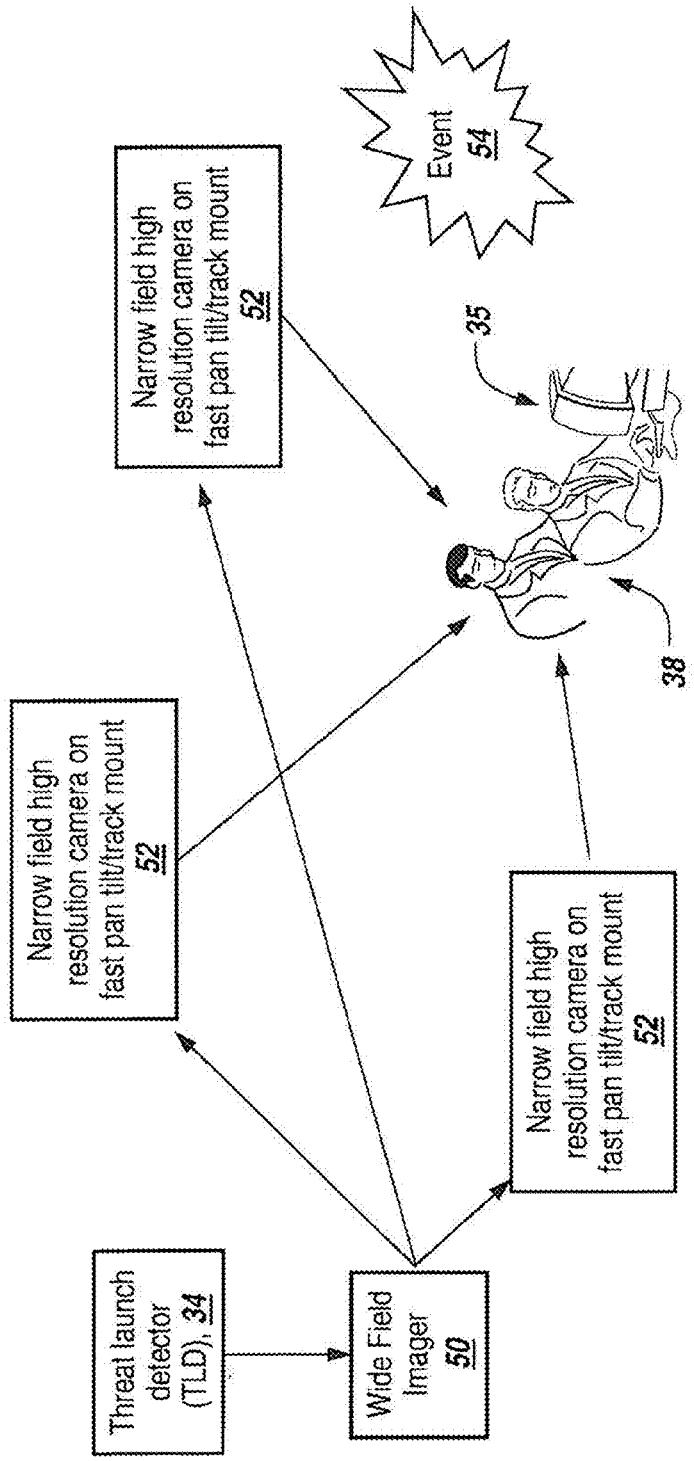
FIG. 3 is a diagrammatic illustration showing the network cell in a preferred embodiment of the system of the present invention.

Referring now to FIG. 3, a network cell includes Threat Launch Detector 34 which may include a wide field imager 50. The information from the wide field imager is communicated to a number of spaced apart sensor nodes 52, each of which have a narrow field high resolution camera on a fast pan tilt/track mount.

All of these nodes communicate with the threat monitor station and processing node 35 having personnel 38 to evaluate an event 54 which may correspond to the detection of smoke or the plume of a launched rocket, along with visual configuration of, and/or tracking of the launched rocket.

Figure 4:
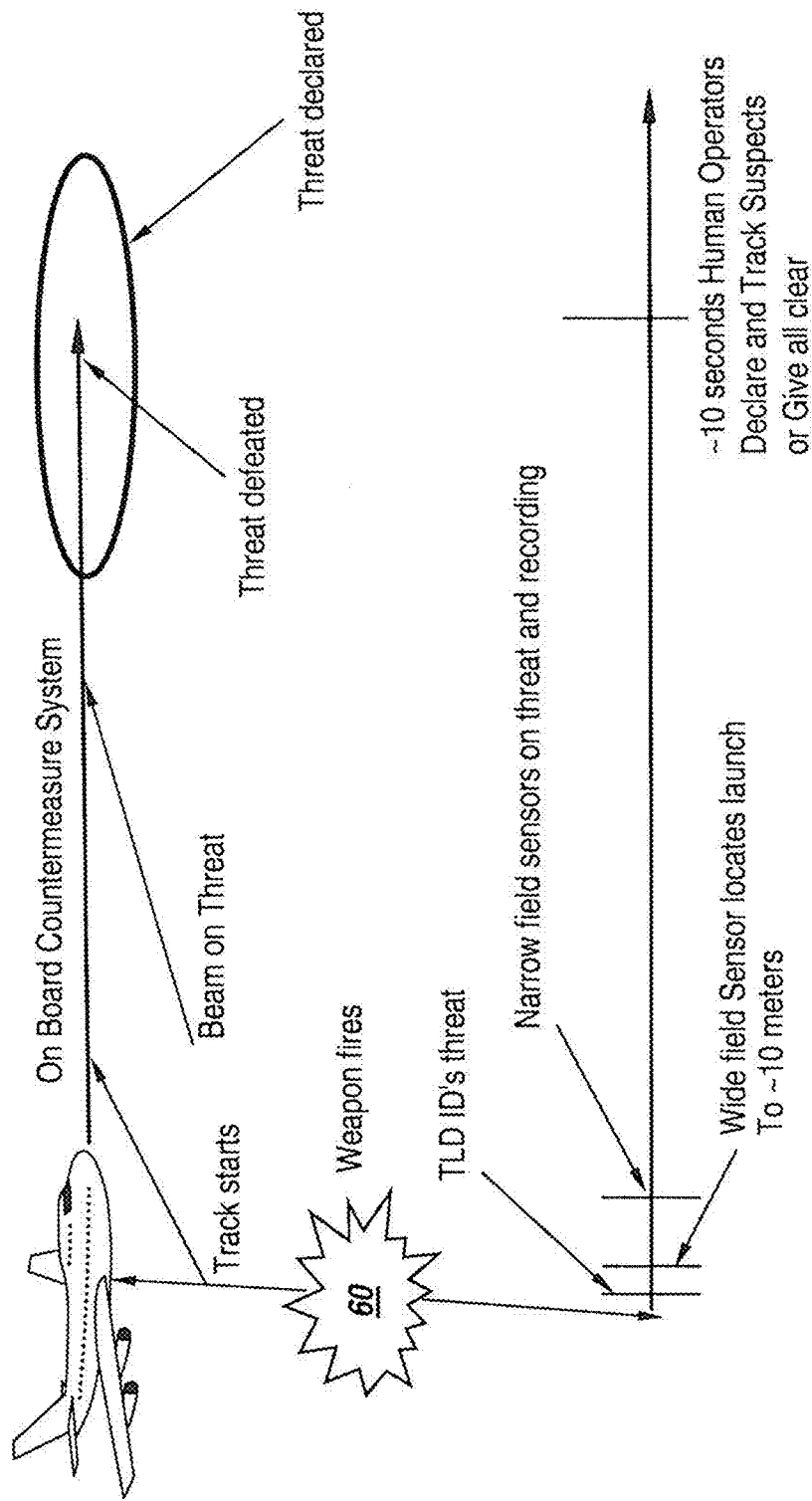
FIG. 4 is a time line in a preferred embodiment of the method of the present invention.

In one embodiment, the wide field imager operates within the visible or infrared region of the electromagnetic spectrum, whereas the narrow field, high resolution cameras operate visible region of the electromagnetic spectrum. To keep the narrow field of view cameras properly trained on the terrorists, IR localization, face recognition, edge tracking and laser range finding techniques can be employed to close the tracking loop Elements of the network are nodes for communication, processing and sensing. FIG. 4 shows a typical time line. Communication elements provide dedicated secure communication of alerts, geolocation coordinates, and video imagery. These elements are available off the shelf commercially.

As can be seen by timelines of FIG. 4, the firing of a weapon illustrated at 60 can either be detected by an onboard countermeasure system or can be detected by a ground-based system in which the threat launch detector indicates a threat. In this case a very short time after the threat has been detected a sensor detects the location of the launch site within 300 meters. This is followed by pointing the narrow field sensors onto the launch site and recording the activity threat.

In less than 10 seconds human operators declare an event and track suspects or give an "all clear" indication. The countermeasure system aboard an aircraft is a desirable asset to defeat the threat, with the onboard system also communicating with the ground to declare a threat, thus to give ground based personnel a heads up that may arrive prior to a threat launch detector indication. Thus, no more than 10 seconds are required to validate a threat, locate the launch site and to deploy personnel or other countermeasures to the launch site. With an on board, low remorse, countermeasure the attacked aircraft can take action against the threat independently of the ground system. In this instantiation, the aircraft Infrared Countermeasure system operates largely independently of the ground based location system except to provide added confirmation that an attack has occurred.

The subject system can also be used as an enabler of a ground based missile countermeasure system. Most of these employ fire control radars or LADARs which possibly produce hazardous radiation and are thus acceptable only with low false alarm rates. They also enhance the same false alarm consequences of Airport denial unless and until the attackers are located and neutralized.

It will be appreciated that while the subject system is discussed in connection with a ManPADS attack, the subject system may be used to alert personnel to other types of attack including gunfire or any type of explosive device delivery.

Processing nodes perform communication security functions, compress data and match geolocation to sensor node coverages. They send pointing and zoom information to the sensor nodes. These capabilities are widely available commercially in personal computers, especially since artificial intelligence is not required for any embodiment of this system.

Sensor nodes may be assembled in several ways. First is to use a combination of a visible band digital video camera with discrete illumination, an infrared camera and a threat launch detector. This configuration may include a cluster of IR cameras such as longwave microbolometers each covering a part of the entire field of regard that includes the entire solid angle available and includes the launch site and grounds or buildings. The threat launch detector acquires what it determines to be a launch event. It then triggers a search of the longwave imagery to locate event. It then issues an alert and slews the narrow field of view digital video camera to the event.

As mentioned above, a possible interim stage is to use a microbolometer camera to precisely locate the event by finding its induced hot spot. This is the function of localization detector 35 of FIG. 2. This location can be found in about one second with simple subtractive image processing. It locates the event and becomes the target point of the high definition angle cameras. Line of sight data enables the processing node to also set the zoom lenses to an appropriate focal length. An aperture of about 8.5 inches provides resolution sufficient for facial recognition at 1 Km.

The video camera can work under all but moonless overcast conditions. For these a discrete illuminator comes into use. In one embodiment, a near infrared light emitting diode emitting at wavelengths invisible to human eye is used with silicon or Generation 1 or Generation 2 night vision devices (about 0.9 micrometers). Haze, fog and smoke are not issues because these conditions also prevent ManPADS attack. Smoke might be used after the launch but presence of multiple high resolution cameras at various angles assures that the attacker will be spotted leaving the obscured area. A companion IR camera may he used to assist in tracking the selected subject or subjects and provide smoke penetration.

When no event can be found, the sensors can be trained to provide surveillance in a small perimeter about the suspected area to assure than no one escapes before an on site team can check the area. This approach may increase time to provide an "all clear", but it is still less than would be required to search a larger area when potential terrorists have had as much as 30 minutes to flee and hide.

Deployment requires installation of sensor nodes to provide line of sight coverage to all places that have a line to sight to an incoming or departing aircraft. In open areas this can be done at a density of about one node in a circle of about 0.5 Km radius with an 4 inch aperture. In more built out areas the network requires more nodes; but since the line of sight is shorter, smaller apertures can be employed, thereby reducing cost. Use of cell phone towers and utility poles may be a viable option for deployment.

Those skilled in the art will appreciate that the network of the present invention quickly puts eyes on possible terrorists while weapons are still smoking, note that coverage can start in about one half second from launch. If there are no assailants, false notifications do not shut down facilities. If notification is real, the system can track the terrorists enabling a small team to find and apprehend terrorists. This with the use of counter ManPADS technology, can significantly reduce shoulder launched weapons as threat, because not only is attack unlikely to succeed but the user becomes likely to be caught. Local Threat Launch Detector (TLD) output can trigger network to enable it to find snipers and users of other weapons. Moreover, Threat Launch Detector and network sensors can also be used to correlate to counter ManPADS notifications to quickly rate their importance and validity.

It will be appreciated that the subject method and system of the presentation can also be used to locate sniper positions or other terrorists weapon positions such as mortar, rocket, or propelled grenade (RPG) positions.

While the present invention has been described in connection with the preferred embodiments of the various figures, it is to be understood that other similar embodiments may be used or modifications and additions may be made to the described embodiment for performing the same function of the present invention without deviating therefrom. For example, an EO or infrared missile launch detector can replace the TLD when its declaration time is close enough. Therefore, the present invention should not be limited to any single embodiment, but rather construed in breadth and scope in accordance with the recitation of the appended claims.

What is claimed is:

1. An automatic method for finding a launch of a Man Portable Air Defense System (ManPADS) missile and providing an ability to identify an individual manning the ManPADs missile launcher, comprising the steps of:
    installing a network of electro optical and infrared cameras with a triggering receiver adapted to activate electro-optical cameras on the sensing of emission from the launch of the ManPADS missile, the electro-optical cameras comprising at least one high resolution video camera providing high resolution video capable of face recognition;
    responsive to activating the electro-optical cameras pointing the electro-optical and infrared cameras in the direction of the emission, the infrared cameras determining the location of the ManPADS missile launcher and slewing the electro-optical high resolution video camera to take a high resolution picture of the individual manning the ManPADs missile launcher; and,
    providing the identity of an individual manning the ManPADS missile launch using the high resolution video from the at least one high resolution video camera.

2. The method of claim 1, wherein the triggering receiver includes a threat launch detector having an omni directional field of view and wherein the infrared camera has a wide field of view and includes a wide field, high speed area surveillance camera for determining the location of the launch of the ManPADS missile.

3. The method of claim 2, wherein the infrared camera and threat launch detector have respective outputs and further including the step of confirming the detection of a ManPADS launch if the output of the infrared camera occurs within a predetermined time limit after the output of the threat launch detector such that the output of the infrared camera is confirmable as corresponding to the launch of a ManPADS missile.

4. The method of claim 3, and further including the step of: using the location from the infrared camera to slew the high resolution video camera to aim at the detected location, the high resolution camera capturing and identifying the individual or individuals responsible for the launch of the ManPADS missile.

5. The method of claim 1, and further including the step of: activating the high resolution video camera only upon confirmation that the indication from the infrared camera corresponds to an actual ManPADS missile launch.

6. The method of claim 1, and further including the step of: pointing and activating the high resolution video camera only when the launch of a ManPADS missile has been confirmed.

7. The method of claim 6, and further including presenting the outputs of all electro-optical and infrared cameras on a display and providing human confirmation of the fact of a ManPADS missile launch based on view of the display.

8. The method of claim 1, wherein all electro-optical and infrared cameras have a line of sight view of the launch location.

9. The method of claim 8, and further including providing enough high resolution electro-optical cameras to assure line of sight acquisition of any potential launch location.

10. The method of claim 1, wherein the pointing of the electro-optical camera is done by slowing the associated camera to the location indicated by the infrared camera and activating the slewed electro-optical camera only when a launch has been confirmed.

11. A system for ascertaining the existence of and location of a launch of an explosively launched weapon towards an aircraft and an identity of individuals participating in the launch comprising:
a threat launch detector positioned so as to be able to view a predetermined area associated with an airport runway and for outputting a signal indicating of the launch of the weapon;
a localization sensor including an infrared camera for detecting the location of the launch of the weapon;
a communication network for communicating the outputs of the threat launch detector and the localization sensor to a threat monitoring station and processing node for confirming a launch;
a separate high definition video camera coupled to the threat monitoring station and processing node;
a triggering receiver for activating the high definition video camera on sensing of emission from the launch of the weapon, the high definition video camera providing high resolution video capable of face recognition, the processing node pointing the infrared camera and the high definition video camera in the direction of the emission and slewing the high resolution video camera to the location detected by the localization sensor to take a high resolution picture of an individual manning the weapon in response to the high definition video camera being activated; and
a recorder for recording the output of the high resolution video camera.

12. The system of claim 11, further including a camera controller for activating and slewing said high resolution video camera only upon confirmation of a launch.

13. The system of claim 11, wherein said threat launch detector includes a single pixel having a wide field of view, and wherein said localization sensor includes a frame rate detector.

14. The system of claim 13, wherein said frame rate detector includes an infrared camera, said localization sensor being sufficient to locate a launch to within less than a few meters.

15. The system of claim 11, wherein said high resolution video camera has a narrow field of view and is only turned on when a launch has been confirmed.

* * * * *